United States Patent [19]
Wilson et al.

[11] 3,863,013
[45] Jan. 28, 1975

[54] FLAVORING AND AROMATISING WITH A FIVE OR SIX MEMBERED HETEROCYCLIC DITHIO COMPOUND

[75] Inventors: Richard A. Wilson, Edison; Cynthia Mussinan, Bricktown; Ira Katz, Elberon; Christopher Giacino, Califon; Anne Sanderson, Highlands, all of N.J.; Edward J. Shuster, Brooklyn, N.Y.

[73] Assignee: International Flavors & Fragrance Inc., New York, N.Y.

[22] Filed: July 17, 1972

[21] Appl. No.: 272,396

[52] U.S. Cl.................................. 426/65, 252/522
[51] Int. Cl............................................. A23l 1/26
[58] Field of Search........................ 426/65, 175, 221

[56] References Cited
UNITED STATES PATENTS
3,503,758  3/1970  Wada et al.......................... 426/221

Primary Examiner—Joseph M. Golian
Attorney, Agent, or Firm—Brooks Haidt & Haffner

[57] ABSTRACT

A five or six membered heterocyclic compound having two sulfur atoms, such as a dithiolane or a dithiane, is used to alter the flavor or aroma of a consumable material such as a foodstuff or perfume.

8 Claims, No Drawings

FLAVORING AND AROMATISING WITH A FIVE OR SIX MEMBERED HETEROCYCLIC DITHIO COMPOUND

BACKGROUND OF THE INVENTION

The present invention has to do with altering the organoleptic properties of a consumable material. More particulary, this invention relates to the use of five membered or six membered heterocyclic compounds containing two sulfur atoms, such as a dithiolane or a dithiane to alter the flavor and/or aroma characteristics of a consumable material such as a foodstuff, or perfume.

The term "alter" in its various forms is used herein to mean the supplying or imparting of a flavor or aroma characteristic or note to an otherwise bland, relatively tasteless or non-odorous substance, or augmenting an existing flavor or aroma characteristic where the natural flavor or intrinsic odor is deficient in some regard, or supplementing the existing flavor or aroma impression to modify its quality, character, taste or aroma.

The term "consumable material" as used herein includes various products that are utilized by natural persons and includes foodstuffs and perfumes.

The term "foodstuff" as used herein includes both solid and liquid ingestible materials which usually do, but need not have nutritional value. Thus, foodstuffs include meats, gravies, soups, convenience foods, beverages, dairy products, candies, vegetables, cereals, soft drinks, snacks and the like.

The term "perfume" as used herein means a mixture of compounds, including for example, natural oils, synthetic oils, alcohols, aldehydes, ketones, esters, lactones, and frequently hydrocarbons which are admixed so that the combined odors of the individual components produce a pleasant or desired fragrance. Such perfume compositions usually contain: (a) a main note, (b) modifiers which round-off and accompany the main note; (c) fixatives which include odorous substances which lend a particular note to the perfume throughout all stages of evaporation, and substances which retard evaporation; and (d) top-notes which are usually low-boiling, fresh-smelling materials.

Prior Art

Various heterocyclic compounds containing three, four, or five sulfur atoms in the ring have been said to be flavorful or aroma-imparting. Thus, Chang et al. in *Chemistry and Industry* for Nov. 23, 1968, pages 1639–1641, identified 3,5-dimethyl-1,2,4-trithiolane in the volatile flavor compounds of boiled beef; and Wada et al in U.S. Pat. No. 3,503,758 issued on Mar. 31, 1970, describes pentathiepane and various tetrathiepanes as having a good aroma and, therefore, useful as flavor enhancers. The tetra- and pentathiepanes possess a sweet meaty flavor. Polyalkyl symmetrical trithianes have been disclosed in copending U.S. application Ser. No. 166,683 filed July 28, 1971 and now abandoned as having a sweet nutty aroma and taste and suitable for fruit, nut and meat flavors.

SUMMARY OF THE INVENTION

In accordance with this invention it has been found that a five or six membered heterocyclic compound having two sulfur atoms in the ring (hereinafter called "dithio heterocyclic compounds") is useful to alter the flavor or aroma of a consumable material. Such dithioheterocyclic compounds include dithiolanes and dithianes which may be alkyl-substituted or non-alkyl substituted. The two sulfur atoms in the ring may be ortho-, meta-, or para- to each other. Thus, the dithio heterocyclic compounds found suitable according to this invention may be represented by one of the following formulae:

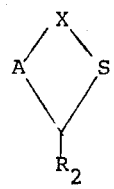 or 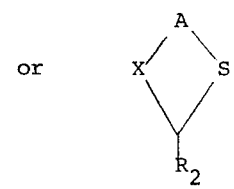

wherein X is

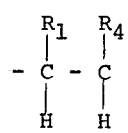 or 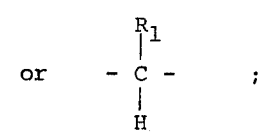

and A is either

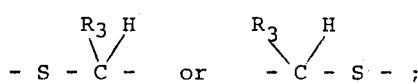

and each of $R_1$ to $R_4$ is hydrogen or a lower alkyl radical of one to three carbon atoms.

DESCRIPTION OF THE PREFERRED EMBODIMENTS

Many of the dithio heterocyclic compounds of this invention are old compounds but have not heretofore been recognized as being useful flavoring or aromatising agents. The dithio heterocyclic compounds have an alium-like flavor of onions or garlic with metallic background notes which make them especially suitable for stewed vegetable type flavor.

1,3-Dithiolane having the structure

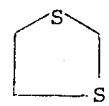

is described in Meadow, J.R. et al., *J.A.C.S.*, Vol. 56, p. 2177 (1934) and U.S. Pat. No. 2,690,988. It has a sweet, sulfury character, which in high levels becomes reminiscent of degrading onions. It is useful for its sulfur notes in chocolate and coffee and roasted garlic notes found in stews, jellied veal dish and gravies. Taste threshold level is 2 parts per billion (2 ppb).

2-Methyl-1,3-dithiolane having the structure

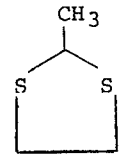

is described in *J. Chem. Soc.*, B, (1970), p. 404 at p. 407 and U.S. Pat. No. 2,690,988. It has a cooked, roasted onion character. The background notes are suitable for stewed vegetable and vegetable protein hydrolyzate type flavors. Its taste threshold value is 20 ppb.

3,5-Dimethyl-1,2-dithiolane having the formula

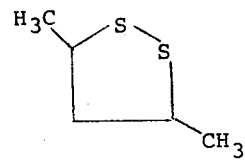

is described in Schotte, L., *Arkiv. Kemi.*, Vol. 9, p. 441 (1956). It has a cooked onion note developing into a cooked vegetable nutty note. Its taste threshold value is 10 ppb.

3-Methyl-1,2-dithiolane having the formula

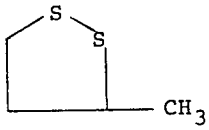

It has an oniony metallic taste with cooked beef or braised and vegetable nuances. It is suitable for stewed vegetable and braised beef flavors. Taste threshold level is 2 ppb.

2,4-Dimethyl-1,3-dithiolane having the structure

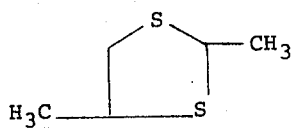

is described by Leggeter B.E. et al. in *Can. J. Chem.*, Vol. 41, No. 10, p. 2671 (1963). It has an onion-like taste with slight metallic background notes and is suitable for stewed vegetable flavors. Its taste threshold value is 20 ppb.

4-Methyl-1,3-dithiolane having the structure

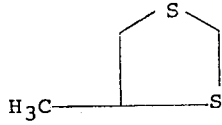

is generally described in U.S. Pat. No. 2,690,988. It has an oniony, root vegetable-like taste and is useful for stewed vegetable or braised beef type flavors. Its taste threshold value is 50 ppb.

1,2-Dithiane (ortho-dithiane) having the formula

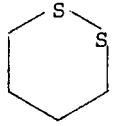

is described in Schoberl, A. et al., *Ann.*, Vol. 614, p. 66 (1958). It has a garlic character with slight metallic nuance and is suitable for stewed vegetable and horseradish flavors. Its taste threshold value is 2 ppb.

1,3-Dithiane (m-dithiane) having the formula

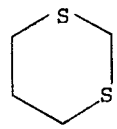

and has been described by Meadow & Read in *J.A.C.S.*, Vol. 56, p. 2177 (1934). It has an onion, garlic-like taste with a metallic by-note and is suitable for meat alium flavors. Its taste threshold value is 50 ppb.

1,4-Dithiane (p-dithiane) having the formula

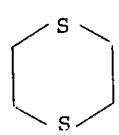

has been described in *J. Chem. Soc.*, B, (1970), p. 404 at 407. It has an onion-like or garlic-like character and is useful for stewed vegetable type flavors. Its taste threshold value is 50 ppb.

2-Methyl-1,3-dithiane having the formula

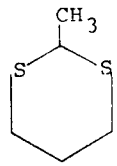

has been described by Autenreith, W. et al in *Ber.*, 32, p. 1375 (1899). It has an onion-like character with metallic notes and is suitable for vegetable type flavors. Its taste threshold value is 20 ppb.

2,4-Dimethyl-1,3-dithiane having the formula

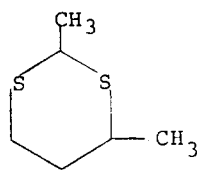

is described by Eliel et al., in *J.A.C.S.* Vol. 91, No. 10, p. 2703 (1969). It has an allium-onion like character with slight metallic notes and is suitable for onion flavors. Its taste threshold value is 5 ppb.

4-Methyl-1,3-dithiane having the formula

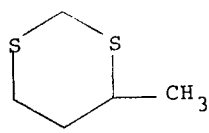

It has an onion, garlic and tomato like character and is suitable for stewed meats, gravy, tomato and onion flavors. It has a taste threshold level of 50 ppb.

2,4,6-Trimethyl-1,3-dithiane having the formula

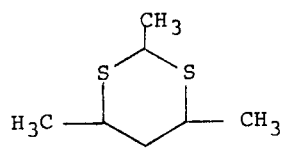

has been described by Eliel et al., *J.A.C.S.*, 91, No. 10, p. 2703 (1969). It has a root vegetable-like character and is suitable for stewed vegetable or potato flavors. Its taste threshold level is 10 ppb.

The compounds named and the structural formulae given contemplate and include cis-, trans-, and other conformational isomers.

The heterocyclic compounds described herein may be employed either singly or in admixtures comprising two or more thereof. Admixtures of two or more dithiolanes or dithianes offers the advantages of combining the beneficial and organoleptic qualities of each of the compounds into a total impact which is superior or different from the characteristics of the sole ingredient. The formulator can simulate a wide variety of organoleptic characteristics to evoke a predetermined taste response on the part of the consumer.

Generally in use the dithio heterocyclic compound is admixed with one or more auxiliary flavoring or perfume adjuvants. The precise adjuvants employed will depend upon the ultimate use contemplated and the organoleptic character desired. Flavoring adjuvants are recognized in the art and are ingestibly acceptable or non-toxic. Such flavoring adjuvants include stabilizers, thickeners, surface active agents, conditioners, flavorants and flavor intensifiers.

Stabilizers include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, sequestrants, e.g., citric acid.

Thickeners include carriers, binders, protective colloids, suspending agents, emulsifiers and the like, e.g., agar-agar; carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches; pectins, and emulsifiers, e.g., mono- and diglycerides of fatty acids.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, tumeric and curcunin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferric pyrophosphate, ferrous gluconate and the like, riboflavin, vitamins, zinc sources such as zinc chloride, zinc sulfate and the like.

Flavorants and flavor intensifiers include organic acids, e.g., fatty saturated, unsaturated and amino acids; alcohols, e.g., primary and secondary alcohols; esters, carbonyl compounds including aldehydes and ketones, lactones; cyclic organic materials including benzene derivatives; alicyclics, heterocyclics such as furans, particularly 2-acetylfuran, pyridines, pyrazines and the like, sulfur-containing materials including thiazoles, thiols, sulfides, disulfides and the like; so-called flavor potentiators such as monosodium glutamate, guanylates, inosinates, natural and synthetic flavorants such as vanillin, natural gums and the like; spices, herbs, essential oils and extractives including anise, anise oil, alkanet root extract, bay leaves, capsicum extract and the like.

The specific flavoring adjuvant selected for use may be either solid or liquid, depending upon the desired physical form of the ultimate product, i.e., foodstuff, whether simulated or natural, and should, in any event, be capable of providing an environment in which the dithio heterocyclic compound can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted. In contra-distinction, in the preparation of solid products, e.g., simulated foodstuffs, ingredients capable of providing normally solid compositions should be selected such as various cellulose derivatives.

Among the preferred flavoring adjuvants are: methyl thiazole alcohol [4-methyl-5-($\beta$-hydroxyethyl)thiazole], 2-methyl butanethiol, 4-mercapto-2-butanone, 3-mercapto-4-pentanone, 1-mercapto-2-propanone, benzaldehyde, furfural, furfuryl alcohol, 2-mercapto propionic acid, 2-pentene, alkyl pyrazines such as methyl pyrazine, 2-ethyl-3-methyl pyrazine and tetramethyl pyrazine, polysulfides such as dipropyl disulfide and methyl benzyl disulfide, alkyl thiophenes such as 2-butyl thiophene and 2,3-dimethyl thiophene, 5-methyl furfural, acetyl furan, 2,4-decadienal, guiacol, phenyl acetaldehydes, $\delta$-decalactone, d-limonene, acetoin, amyl acetate, maltol, ethyl butyrate, levulinic acid, piperonal, ethyl acetate, n-octanal, n-pentanal, hexanal and diacetyl. When used as a stewed vegetable flavoring it is especially preferred to combine the dithio heterocyclic compound with any one or more of a 2-alkyl thiazole such as 2-isobutyl thiazole, propyl propenyl disulfide, and propyl propenyl trisulfide.

Auxiliary perfume adjuvants include carriers, vehicles, solvents, dispersants, emulsifiers, surface-active agents, aerosol propellants, and the like. In perfume compositions, the individual components contribute their particular olfactory characteristics, but the overall effect of the perfume composition will usually at least be the sum of the effect of each ingredient. Thus, the dithio heterocyclic compounds of this invention can be used to alter the aroma characteristics of a perfume composition, for example, by highlighting or moderating the olfactory reaction contributed by another ingredient of the composition.

The amount of dithio heterocyclic compound employed in a particular instance can vary over a relatively wide range to achieve the desired organoleptic effects and in accordance with the ultimate consumer use. Thus, correspondingly greater amounts would be necessary in those instances wherein the ultimate consumable product to be flavored or aromatised is relatively bland to the senses; whereas, relatively lesser quantities may suffice for purposes of enhancing a composition merely deficient in a natural flavor or aroma. The primary requirement is that the amount selected be effective, i.e., sufficient to alter the organoleptic characteristics of the material to which it is added or incorporated. The quantity used will depend on the ultimate consumable product, the amount and type of flavor or aroma initially present in the product, required and other preference factors, storage conditions, and the preconsumption or processing conditions to which the product or composition will be subject.

Effective quantities of the dithio heterocyclic compounds of this invention range from 0.2 parts per billion to about 500 parts per billion based on the total weight of the foodstuff to which it is added. While larger concentrations can be used they are less economic since additional amounts do not necessarily give equivalent incremental flavor enhancement. In those instances wherein the dithio heterocyclic compounds of this invention are added to the foodstuff as an essential and integral part of a flavoring composition, it is, of course, necessary that the total quantity of flavoring composition employed be sufficient to yield an effective dithio heterocyclic compound concentration.

Flavoring compositions prepared in accordance with the present invention preferably contain the dithio heterocyclic compound in concentrations ranging from $2 \times 10^{-7}$ to about 10 percent by weight, based on the total weight of said flavoring compositions, but may contain as much as 80 or 90 percent by weight of the dithio compound if the flavoring composition is then applied in very small amount.

The dithio heterocyclic compounds of this invention can also be added to perfume compositions in their pure form or they can be added to mixtures of materials in fragrance-imparting compositions to provide a desired fragrance character to a finished perfume material. The perfume and fragrance compositions obtained according to this invention are suitable in a wide variety of perfumed articles and can also be used to improve, enhance, modify, alter or reinforce fragrance materials. It will thus be appreciated that the dithio heterocyclic compounds and mixtures thereof of this invention are useful as olfactory agents and fragrances.

The amount of one or more compounds of this invention which will be effective in perfume compositions depends on many factors, including the other ingredients, cost, their amounts and the fragrance and other effects desired.

When used as a perfume ingredient, the dithio heterocyclic compound will represent from about 0.001 percent to about 0.05 percent of the total weight of the perfume oils present in the composition. Even lesser quantities may be used to intensify or augment and enhance various types of fragrance compounds, the odors of which may be desired to be imparted to colognes, perfumes, bath oils, powders, and other cosmetic products.

All parts, proportions, percentages and ratios herein are by weight unless otherwise indicated.

It will be understood by those skilled in the art that the dithio heterocyclic compounds can be added to the materials to be flavored or aromatised at any convenient point in the production of the consumable material by any of the conventional techniques including spray drying, blending, stirring, dissolving and the like. Thus, when they are used to alter or otherwise vary the flavor of a foodstuff, they can be added in the original mixture, dough, emulsion, batter, or the like, prior to any cooking or heating operation. Alternatively, they can be added at a later stage of processing if volatilization losses would be excessive during the earlier processing.

The following examples are given to illustrate embodiments of the invention as it is now preferred to practice it. It will be understood that these examples are illustrative, and the invention is not to be considered as restricted thereto except as indicated in the appended claims.

EXAMPLE I

Synthesis of 3-Methyl-1,2-Dithiolane

A mixture of 250 ml of triethylene glycol and 160 grams (2.1 moles) of thiourea is stirred at 75°C in a one liter, three-necked, round-bottomed flask equipped with a mechanical stirring apparatus, an immersion thermometer, a 500 ml addition funnel and a 14 inch glass 5 × 5 Raschig rings packed reflux column with a variable ratio vacuum distillation head on top. 200 grams of 1,3-dibromo butane is added in portions via the addition funnel. The addition is slightly exothermic and the temperature rises to approximately 100°C. After the addition is completed, the homogeneous reaction mixture is stirred at 75°–100°C for an additional 15 minutes after which a vacuum of 18 mm Hg is applied to the system and 189.3 grams (1 mole) of tetraethylene pentamine is added dropwise via the addition funnel over the course of approximately 30 minutes. The pot temperature is maintained at approximately 80°C with a heating mantle. The reaction mixture turns a deep red-brown color. Some light yellow to colorless vapors distill over and are not condensed in the water condenser. After addition is completed, the vacuum is increased to 12 mm Hg and the pot temperature is increased to approximately 105°C. A yellow to yellow-green material begins to distill at a temperature of 62°C. It is collected; boiling between 62°–78°C and a pot temperature of 105°–134°C. The mixture is purified by gas liquid chromatography in a 19 foot × ⅛ inch — 5 percent Carbowax 20M (polyethylene glycol — terephthalic acid terminated) column and identified by mass spectroscopy as 1,3-butane dithiol and 3-methyl-1,2-dithiolane, respectively.

EXAMPLE II

Synthesis of 4-Methyl-1,3-Dithiolane

In a 500 ml, three-necked round-bottomed flask equipped with a mechanical stirring apparatus, an immersion thermometer and a water-cooled reflux condenser followed by a dry ice/isopropanol condenser are mixed 20 grams of 1,2-propanedithiol, 30 grams of dimethoxymethane, 5 grams of p-toluene sulfonic acid and 300 ml of benzene. The reaction mixture is stirred and refluxed for three hours. It is then washed two times with 50 ml portions of 5 percent $NaHCO_3$ and twice with distilled water. The benzene layer is dried over anhydrous $Na_2SO_4$ and concentrated to a yellowish oil on a rotary evaporator. The dried mixture is then subjected to gas-liquid chromatography on a 25 foot × ¼ inch 10 percent SF–96 column (a silicone fluid made and sold by General Electric Company) and three major peaks are trapped for analyses. The first is 4-methyl-1,3-dithiolane. Mass spectral analysis shows the following peaks in order of decreasing intensity: 120, 74, 41, 45, 78, 46, 59, 39, 55, and 60.

EXAMPLE III

Synthesis of 3-Methyl-1,2-Dithiolane

A mixture of 250 ml of triethylene glycol and 160 grams (2.1 moles) of thiourea is stirred at 75°C in a 1 liter, three-necked, round-bottomed flask equipped with a mechanical stirring apparatus, an immersion thermometer, a 500 ml addition funnel and a 14 inch glass 5 × 5 — Raschig rings packed reflux column with a variable ration vacuum distillation head on top. 200 grams of 1,3-dibromo butane is added in portions via the addition funnel. The addition is slightly exothermic and the temperature rises to approximately 100°C. After the addition is completed, the homogeneous reaction mixture is stirred at 75° – 100°C for an additional 15 minutes after which a vacuum of 18 mm Hg is applied to the system and 189.3 grams (1 mole) of tetraethylene pentamine is added dropwise via the addition funnel over the course of approximately 30 minutes. The pot temperature is maintained at approximately 80°C with a heating mantle. The reaction mixture turns a deep red-brown color. Some light yellow to colorless vapors are distilled over and are not condensed in the water condenser. After addition is completed, the vacuum is increased to 12 mm Hg and the pot temperature is increased to approximately 105°C. A yellow to yellow-green material begins to distill at a temperature of 62°C. It is collected boiling between 62°–78°C and a pot temperature of 105°–134°C. The material obtained is subjected to gas-liquid chromatography on a 19 foot × 1/8 inch 5 percent Carbowax 20M (polyethylene glycol-terephthalic acid terminated) column and two peaks of roughly equal proportions are trapped and identified by mass spectroscopy as 1,3-butanedithiol and 3-methyl-1,2-dithiolane, respectively.

EXAMPLE IV

Preparation of 4-Methyl-1,3-Dithiane

In a 500 ml, three-necked, round-bottomed flask equipped with a mechanical stirring apparatus, an immersion thermometer and a water-cooled reflux condenser followed by a dry ice isopropanol condenser are mixed 300 ml benzene, 20 grams of 1,3-butane dithiol, 3 grams of p-toluene sulfonic acid and 15 grams of dimethoxymethane. The reaction mixture is heated to reflux with a stirring for approximately 3 hours. It is then washed twice with 50 ml portions of 5 percent sodium bicarbonate; then the dried benzene is concentrated to approximately 30 ml in vacuo. Sufficient material of each of the four main components (determined by GLC on a 25 foot × 1/4 inch 10 percent SF–96 column) is trapped out by preparatory gas liquid chromatography for mass spectral identification and evaluation and further spectral analyses where desired. The first component trapped is unreacted dimercaptan. The second is 4-methyl-1,3-dithiane. The remaining compounds are unknowns of molecular weights 166 and 210, respectively. Mass spectral analysis of the 4-methyl-1,3-dithiane shows the following peaks in order of decreasing intensity: 134, 55, 60, 45, 46, 87, 88, 47, 101, and 59.

EXAMPLE V

A tomato soup is prepared by adding 1.0 parts of 2,5-dimethyl-1,3-dithiane to a mixture of 360 parts of water and 42 parts of the following mixture:

| Ingredient | Parts By Weight |
| --- | --- |
| Hydrolyzed Vegetable Protein | 3.00 |
| Beatrine C (a spray dried fat) | 6.50 |
| Tomato powder | 46.00 |
| Sucrose | 14.30 |
| Salt | 7.75 |
| Monosodium glutamate | 6.00 |
| Locust bean gum | 1.50 |
| Corn starch | 14.25 |
| Onion powder | 0.07 |
| Garlic | .045 |
| Majoram ground | .045 |
| White pepper ground | .020 |
| Basil ground | .020 |

The dithiane contributes a stewed vegetable note.

EXAMPLE VI

A vegetable broth is prepared by admixing 0.5 parts of 3,5-dimethyl-1,2-dithiolane with 170 parts of hot water in which are dissolved 4.8 parts of the following mixture:

| Ingredient | Parts by Weight |
| --- | --- |
| Hydrolyzed Plant Protein (Maggi's 4-BE Powder) | 9.24 |
| Monosodium glutamate | 1.20 |
| Onion Powder | 1.30 |
| Yeast Autolysate | 1.20 |
| Sugar | 2.40 |
| Celery salt | 0.24 |
| Caramel Powder | 0.20 |
| Salt | 3.66 |
| Hydrogenated Vegetable Oil | 0.53 |
| Parsley granules | 0.20 |
| Cayenne Pepper | 0.01 |
| | 20.00 |

The dithiolane improves the vegetable flavor of the broth.

EXAMPLE VII a. Preparation of Spray-Dried Product:

The following ingredients are refluxed for four hours, aged for three days and spray-dried to produce a solid product having a beef flavor. Before drying sufficient gum arabic is added to provide a composition containing 0.5 parts gum arabic and one part flavor solid.

| Ingredients | Parts |
| --- | --- |
| L-cysteine hydrochloride | 1.32 |
| Carbohydrate-free vegetable protein hydrolyzate | 22.05 |
| Ethyl thioacetate | 22.00 |
| Thiamine hydrochloride | 1.32 |
| $\beta$-alanine | 0.50 |
| Water | 53.31 | b. Preparation of Beef Gravy:

A beef gravy concentrate is produced by formulating a gravy flavor composition of the ingredients and in the amounts indicated.

| Ingredients | Grams/Unit |
| --- | --- |
| Flour | 34.20 |
| Cornstarch | 36.00 |
| Beef fat | 61.20 |
| Sodium chloride | 9.90 |
| Monosodium glutamate | 7.20 |
| Carbohydrate-free vegetable protein hydrolyzate | 19.80 |
| Toasted onion powder | 2.52 |
| White pepper | 0.36 |
| The spray-dried product of part VII (a) above | 5.40 |

To this mixture is added, at the rate of 3 ppm, 2-methyl-1,3-dithiolane. The said dithiolane improves the roasted meat flavor character of the mixture.

To one unit of said gravy flavor concentrate 24 ozs. of water are added, and the mixture is stirred thoroughly to disperse the ingredients, brought to a boil, simmered for one minute and served. The meatless gray obtained shows excellent roasted meat flavor.

EXAMPLE VIII a. Preparation of Chicken Flavor:
The following mixture is prepared:

| Ingredients | Parts |
| --- | --- |
| Fat | 640 |
| Sodium chloride | 320 |
| Glutamic acid | 5 |
| L-cysteine hydrochloride | 10 |
| β-alanine | 2 |
| Glycerine | 5 |
| Thiamine hydrochloride | 10 |
| Mixture of disodium inosinate and disodium guanylate | 4 |

The foregoing mixture is continuously fed to a scraped wall heat exchanger where it is heated for one-half minute at 325°F. The mixture is then immediately cooled at 100°F in a second scraped wall heat exchanger.

After cooling, 0.12 parts of diacetyl and 0.10 parts of hexanal are added. The mixture has a chicken flavor.

b. Preparation of Chicken Flavored Gravy:

A mixture for the preparation of chicken flavored gravy is prepared by blending the following ingredients:

| Ingredients | Parts |
| --- | --- |
| Cornstarch | 29 |
| Flour | 21 |
| Chicken fat | 11 |
| Crisco brand of hydrogenated vegetable oil | 11 |
| Sodium chloride | 9 |
| Monosodium glutamate | 5 |
| Chicken flavor prepared in Part (a) of this Example | 7 |
| Sucrose | 2 |
| Onion powder | 0.50 |
| Tumeric | 0.05 |
| Celery seeds | 0.02 |
| White pepper | 0.02 |

To this mixture is added 30 ppb of 1,3-dithiolane, 50 ppb of 2-methyl-1,3-dithiolane and 80 ppb of 3-methyl-1,2-dithiolane. The mixture of the above three dithiolanes imparts to this gravy mixture an intense braised chicken flavor character.

About 10 parts of the gravy mixture is thoroughly dispersed in 10 parts of cooled water. The dispersion is then brought to a boil and simmered for 2 minutes. A gravy having an excellent braised chicken flavor is obtained.

EXAMPLE IX a. Preparation of Flavor Mixture:
The following mixture is prepared:

| Ingredients | Parts |
| --- | --- |
| Methyl thiazole alcohol | 53.0 |
| 5-Methyl furfural | 5.0 |
| 2,4-Dimethyl-1,3-dithiane | 4.0 |
| Guaiacol | 1.5 |
| Methyl mercaptan | .5 |
| Tetrahydrothiophenone-3 | 5.0 |
| Methional | 1.0 |
| Tetrahydrofurfuryl alcohol | 30.0 | b. Preparation of Soup:
A beef noodle soup is prepared by mixing together:

| Ingredients | Parts |
| --- | --- |
| Sodium chloride | 50 |
| Mixture of Part (a) of this Example | 30 |
| Gelatin | 10 |
| Monosodium glutamate | 4 |
| Caramel color | 4 |
| Garlic powder | 1 |
| White pepper, ground | 6 |
| Mixed vegetable basis | 360 |

Three cups of water are added to the above mixture and the mixture is brought to a full boil, simmered for 5 minutes and is then ready to serve.

The 2,4-dimethyl-1,3-dithiane imparts a sulfury-meaty note to the soup with a desirable brothy metallic flavor.

EXAMPLE X a. Preparation of Flavor Mixture:
The following mixture is prepared:

| Ingredients | Parts |
| --- | --- |
| Methyl thiazole alcohol | 55.0 |
| 4-Methyl-1,3-dithiolane | 15.0 |
| Amyl alcohol | 10.0 |
| Methional | 2.0 |
| Hexanal | 5.0 |
| Diacetyl | 10.0 |
| Ethyl disulfide | 3.0 | b. Preparation of Shake Composition:

A "shake" composition for enhancing the flavor of meats is prepared by admixing the following ingredients:

| Ingredients | Parts |
| --- | --- |
| Turmeric | 25.0 |
| Paprika | 25.0 |
| Oregano | 15.0 |
| Monosodium glutamate (fine grind) | 25.0 |
| Sodium chloride (fine grind) | 550.0 |
| Mixture of Part (a) of this Example | 400.0 |

When sprinkled on meat the above mixture imparts thereto a sweet, pungent, lifting effect and this effect is caused by the presence of 4-methyl-1,3-dithiolane.

EXAMPLE XI a. Preparation of Flavor Mixture:
The following mixture is prepared:

| Ingredients | Parts |
| --- | --- |
| Methyl thiazole alcohol | 40.0 |
| 3-Methyl-1,2-dithiolane | 2.0 |
| 2,6-Dimethyl pyrazine | 4.0 |
| Acetophenone | 2.0 |
| Guaiacol | 1.0 |
| Tetrahydrofurfuryl alcohol | 46.0 |
| 2-Methyl-2-butenal | 2.0 |
| Furfuryl mercaptan | 0.2 |
| Onion oil | 0.1 |
| Acetyl propionyl | 2.7 | b. Preparation of Beef Gravy:

A beef gravy concentrate is made by formulating a gravy flavor composition of the ingredients and in the amounts indicated.

| Ingredients | Grams/Unit |
| --- | --- |
| Flour | 34.20 |
| Cornstarch | 36.00 |
| Beef fat | 61.20 |
| Sodium chloride | 9.90 |
| Monosodium glutamate | 7.20 |
| Carbohydrate-free vegetable protein hydrolyzate | 19.80 |
| Toasted onion powder | 2.52 |
| White pepper | 0.36 |
| The mixture of Part (a) of this Example | 5.40 |

To one unit of gravy flavor concentrate 24 ozs. of water are added and the mixture is stirred thoroughly to disperse the ingredients, brought to a boil, simmered for one minute and served. This meatless gravy has an excellent cooked beef character primarily caused by the presence of the 3-methyl-1,2-dithiolane included in the flavor mixture of Part (a) of this Example.

EXAMPLE XII

The following perfume composition is prepared:

| Ingredients | Parts By Weight |
| --- | --- |
| 1,3-dithiolane (10% in diethyl phthalate) | 2 |
| 2-methyl-1,3-dithiolane (2% in diethyl phthalate) | 2 |
| 3-methyl-1,2-dithiolane (0.1% in diethyl phthalate) | 5 |
| Benzyl acetate | 125 |
| Benzyl alcohol | 75 |
| 4(4-methyl,4-hydroxyamyl) Δ 3-cyclohexene carboxaldehyde | 25 |
| 6-oxa-1,1,2,2,3,3,8-hexamethyl-2,3,5,6,7,8-hexahydro-1H-benz(f)indene (50% solution in diethyl phthalate) | 10 |

| Ingredients | Parts by Weight |
| --- | --- |
| Linalool | 90 |
| Linalyl acetate | 70 |
| Methyl anthranilate | 2 |
| Indol | 2 |
| Terpineol | 10 |
| Nerolidol | 10 |
| 1,1,2,3,3-pentamethyl-4,5,6,7-tetrahydro-indan-4-one | 2 |
| Oil of bitter orange | 5 |
| α-heptylidene cyclopentanone | 7 |
| Ortho tertiary butyl cyclohexenol | 20 |

The 1,3-dithiolane imparts to this floral bouquet a green, woody undertone. The 2-methyl-1,3-dithiolane imparts to the floral bouquet a floral citrus topnote. The 3-methyl-1,2-dithiolane imparts to the floral bouquet a natural Ylang undertone.

What is claimed is:

1. A process for altering the flavor or aroma of a foodstuff which comprises adding to said foodstuff a flavor or aroma effective amount of a five or six membered heterocyclic compound having two sulfur atoms in the ring of the formula

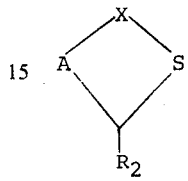 or 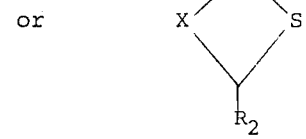

wherein X is

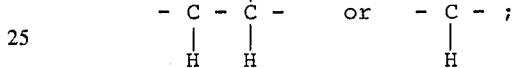

and A is either

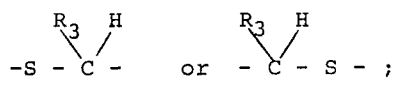

and each of $R_1$ to $R_4$ is hydrogen or a lower alkyl radical of one to three carbon atoms.

2. A process as defined in claim 1 wherein said heterocyclic compound is a dithiolane.

3. A process as defined in claim 2 wherein said dithiolane is 1,3-dithiolane; 2-methyl-1,3-dithiolane; 3,5-dimethyl-1,2-dithiolane; 3-methyl-1,2-dithiolane; 2,4-dimethyl-1,3-dithiolane; or 4-methyl-1,3-dithiolane.

4. A process as defined in claim 2 wherein said dithiolane is 1,3-dithiolane.

5. A process as defined in claim 2 wherein said dithiolane is 3-methyl-1,2-dithiolane.

6. A process as defined in claim 2 wherein said dithiolane is 2-methyl-1,3-dithiolane.

7. A process as defined in claim 1 wherein said heterocyclic compound is a dithiane.

8. A process as defined in claim 7 wherein said dithiane is 1,2-dithiane; 1,3-dithiane; 1,4-dithiane; 2-methyl-1,3-dithiane; 2,4-dimethyl-1,3-dithiane; 4-methyl-1,3-dithiane; or 2,4,6-trimethyl-1,3-dithiane.

* * * * *

UNITED STATES PATENT OFFICE
CERTIFICATE OF CORRECTION

PATENT NO. : 3,863,013

DATED : January 28, 1975

INVENTOR(S) : RICHARD A. WILSON, CYNTHIA MUSSINAN, IRA KATZ, CHRISTOPHER GIACINO, ANNE SANDERSON, and EDWARD J. SHUSTER It is certified that error appears in the above-identified patent and that said Letters Patent are hereby corrected as shown below:

Col. 13, Example XII, line 38, "6-oxa-1,1,2,2,3,3,8-hexamethyl-", should be --6-oxa-1,1,2,3,3,8-hexamethyl- --

Signed and sealed this 15th day of July 1975.

(SEAL)
Attest:

RUTH C. MASON
Attesting Officer

C. MARSHALL DANN
Commissioner of Patents
and Trademarks